US012045727B2

(12) United States Patent
Min et al.

(10) Patent No.: US 12,045,727 B2
(45) Date of Patent: Jul. 23, 2024

(54) CONTROLLED TEXT GENERATION WITH SUPERVISED REPRESENTATION DISENTANGLEMENT AND MUTUAL INFORMATION MINIMIZATION

(71) Applicant: NEC Laboratories America, Inc., Princeton, NJ (US)

(72) Inventors: Renqiang Min, Princeton, NJ (US); Christopher Malon, Fort Lee, NJ (US); Pengyu Cheng, Durham, NC (US)

(73) Assignee: NEC Corporation, Tokyo (JP)

( * ) Notice: Subject to any disclaimer, the term of this patent is extended or adjusted under 35 U.S.C. 154(b) by 893 days.

(21) Appl. No.: 17/115,464

(22) Filed: Dec. 8, 2020

(65) Prior Publication Data

US 2021/0174213 A1  Jun. 10, 2021

Related U.S. Application Data

(60) Provisional application No. 62/945,274, filed on Dec. 9, 2019, provisional application No. 62/945,270, filed on Dec. 9, 2019.

(51) Int. Cl.
*G06N 3/088* (2023.01)
*G06F 40/20* (2020.01)
(Continued)

(52) U.S. Cl.
CPC ............ *G06N 3/088* (2013.01); *G06F 40/20* (2020.01); *G06N 3/0442* (2023.01); *G06N 3/08* (2013.01);
(Continued)

(58) Field of Classification Search
None
See application file for complete search history.

(56) References Cited

U.S. PATENT DOCUMENTS

2017/0365252 A1* 12/2017 Ushio .................. G06N 3/044
2019/0156817 A1*  5/2019 Li ...................... G06N 3/044

FOREIGN PATENT DOCUMENTS

CN   107291795 A   10/2017

OTHER PUBLICATIONS

Wang, Lei, et al. "Translating a math word problem to an expression tree." arXiv preprint arXiv:1811.05632 (2018). (Year: 2018).*

(Continued)

*Primary Examiner* — Eric Nilsson
(74) *Attorney, Agent, or Firm* — Joseph Kolodka (57) ABSTRACT

A computer-implemented method is provided for disentangled data generation. The method includes accessing, by a bidirectional Long Short-Term Memory (LSTM) with a multi-head attention mechanism, a dataset including a plurality of pairs each formed from a given one of a plurality of input text structures and given one of a plurality of style labels for the plurality of input text structures. The method further includes training the bidirectional LSTM as an encoder to disentangle a sequential text input into disentangled representations comprising a content embedding and a style embedding based on a subset of the dataset. The method also includes training a unidirectional LSTM as a decoder to generate a next text structure prediction for the sequential text input based on previously generated text structure information and a current word, from a disentangled representation with the content embedding and the style embedding.

20 Claims, 8 Drawing Sheets

(51) Int. Cl.
G06N 3/02 (2006.01)
G06N 3/0442 (2023.01)
G06N 3/08 (2023.01)
G06N 3/082 (2023.01)
G06N 3/086 (2023.01)
G10L 15/06 (2013.01)
G10L 15/16 (2006.01)
G10L 15/22 (2006.01)

(52) U.S. Cl.
CPC ............ *G06N 3/086* (2013.01); *G10L 15/063* (2013.01); *G10L 15/16* (2013.01); *G10L 15/22* (2013.01); *G06N 3/02* (2013.01); *G06N 3/082* (2013.01)

(56) References Cited

OTHER PUBLICATIONS

Chen, Wenhu, et al. "Semantically conditioned dialog response generation via hierarchical disentangled self-attention." arXiv preprint arXiv:1905.12866 (2019). (Year: 2019).*

John, Vineet, et al. "Disentangled representation learning for non-parallel text style transfer." arXiv preprint arXiv:1808.04339 (2018). (Year: 2018).*

Yin, Junjie, et al. "A deep learning based chatbot for campus psychological therapy." arXiv preprint arXiv:1910.06707 (2019). (Year: 2019).*

Gholami et al, "Unsupervised Multi-Target Domain Adaptation: An Information Theoretic Approach", arXiv:1810.11547v1 [cs.CV]. Oct. 26, 2018. pp. 1-19.

Subramanian et al, "Multiple-Attribute Text Style Transfer", arXiv:1811.00552v2 [cs.CL]. Sep. 20, 2019. pp. 1-20.

Tishby et al, "The information bottleneck method", arXiv:physics/0004057v1 [physics.data-an]. Apr. 24, 2000. pp. 1-16.

Shen et al, "Style Transfer from Non-Parallel Text by Cross-Alignment", NIPS Conference 2017. Dec. 4-9, 2017. pp. 1-12.

Chen et al, "Isolating Sources of Disentanglement in VAEs", 2018 Conference on Neural Information Processing Systems. Dec. 3-8, 2018. pp. 1-11.

Kraskov et al, "Hierarchical Clustering Using Mutual Information", arXiv:q-bio/0311037v1 [q-bio.QM], Oct. 23, 2018, pp. 1-4, Julich, Germany.

Meila, "Comparing clusterings—an information based distance", Journal of Multivariate Analysis. vol. 98. Available online at www.sciencedirect.com. doi:10.1016/j.jmva.2006.11.013. Dec. 23, 2006, pp. 873-895.

Kullback et al, "On Information and Sufficiency", The Annals of Mathematical Statistics. Mar. 1, 1951. vol. 22, No. 1, pp. 79-86.

Hu et al, "Toward Controlled Generation of Text", Proceedings of the 34th International Conference on Machine Learning. inarXiv:1703.00955v4 [cs.LG] Sep. 13, 2018. pp. 1-10.

Liu et al, "Detach and Adapt: Learning Cross-Domain Disentangled Deep Representation", Proceedings of the IEEE Conference on Computer Vision and Pattern Recognition. Jun. 18-23, 2018. pp. 8867-8876.

Verma et al, "Generalized Zero-Shot Learning via Synthesized Examples", Proceedings of the IEEE Conference on Computer Vision and Pattern Recognition. Jun. 18-23, 2018. pp. 4281-4289.

Chou et al, "Multi-target Voice Conversion without Parallel Data by Adversarially Learning Disentangled Audio Representations", arXiv:1804.02812v2 [eess.AS]. Jun. 24, 2018. pp. 1-6.

Burgess et al, "Understanding disentangling in B-VAE", 31st Conference on Neural Information Processing Systems. Dec. 4-9, 2017. arXiv:1804.03599v1 [stat.ML]. Apr. 10, 2018. pp. 1-11.

John et al, "Disentangled Representation Learning for Non-Parallel Text Style Transfer", Association for the Advancement of Artificial Intelligence. arXiv:1808.04339v2 [cs.CL]. Sep. 11, 2018. pp. 1-11.

Hsieh et al, "Learning to Decompose and Disentangle Representations for Video Prediction", 32nd Conference on Neural Information Processing Systems. Dec. 3-8, 2018. pp. 1-10.

Tran et al, "Disentangled Representation Learning GAN for Pose-Invariant Face Recognition", 2017 IEEE Conference on Computer Vision and Pattern Recognition. Jul. 21-26, 2017. pp. 1283-1292.

Belghazi et al, "Mutual Information Neural Estimation", Proceedings of the 35th International Conference on Machine Learning. Jul. 10-15, 2018. pp. 1-10.

Locatello et al, "Challenging Common Assumptions in the Unsupervised Learning of Disentangled Representations", Proceedings of the 36th International Conference on Machine Learning. Jun. 10-15, 2019. pp. 1-11.

Kingma et al, "Auto-Encoding Variational Bayes", arXiv:1312.6114v10 [stat.ML]. May 1, 2014. pp. 1-14.

Zhou et al, "Talking Face Generation by Adversarially Disentangled Audio-Visual Representation", The 33rd AAAI Conference on Artificial Intelligence. Jan. 27-Feb. 1, 2019. pp. 9299-9306.

Chen et al, "InfoGAN: Interpretable Representation Learning by Information Maximizing Generative Adversarial Nets", 30th Conference on Neural Information Processing Systems. Dec. 5-10, 2016. pp. 1-9.

Lee et al, "Diverse Image-to-Image Translation via Disentangled Representations", Proceedings of the European Conference on Computer Vision. Sep. 8-14, 2018. pp. 1-17.

Poole, "On Variational Bounds of Mutual Information", Proceedings of the 36th International Conference on Machine Learning. Jun. 10-15, 2019. pp. 1-10.

Li et al, "Disentangled Sequential Autoencoder", Proceedings of the 35th International Conference on Machine Learning. Jul. 10-15, 2018. pp. 1-10.

Denton et al, "Unsupervised Learning of Disentangled Representations from Video", 31st Conference on Neural Information Processing Systems. Dec. 4-9, 2017. pp. 1-10.

Vineet John et al "Disentangled Representation Learning for Non-Parallel Text Style Transfer", Proceedings of the 57th Annual Meeting of the Association for Computational Linguistics, pp. 424-434, Jul. 2019 (pp. 424-426, 428; and figure 1).

Ben Poole et al., "On Variational of Mutual Information", arXiv:1905.06922v1, May 2019 (pp. 1, 5).

* cited by examiner

FIG. 4 for $j = 1$ to $M$ do
$\quad$ Sample $k'$ uniformly from $\{1, 2, \ldots, M\}$;
$\quad \hat{R}_j = \log p_\sigma(s_j|c_j) - \log p_\sigma(s_j|c_{k'})$;
end
Update $q_\theta(s, c|x)$ by minimize $\frac{1}{M} \sum_{j=1}^{M} \hat{R}_j$;

CONTROLLED TEXT GENERATION WITH SUPERVISED REPRESENTATION DISENTANGLEMENT AND MUTUAL INFORMATION MINIMIZATION

RELATED APPLICATION INFORMATION

This application claims priority to U.S. Provisional Patent Application No. 62/945,270, filed on Dec. 9, 2019, and U.S. Provisional Application Ser. No. 62/945,274, filed on Dec. 9, 2019, incorporated herein by reference in their entirety.

BACKGROUND

Technical Field

The present invention relates to artificial intelligence and more particularly to a controlled text generation with supervised representation disentanglement and mutual information minimization.

Description of the Related Art

Disentangled representation learning (DRL), which maps different data attributes into different independent low-dimensional latent vector spaces, has attract considerable interests in interpretable deep learning tasks. Learning disentangled semantic representations of natural language is the key to a variety of Natural Language Processing (NLP) tasks, e.g., conditional text generation, style transfer, personalized dialogue systems, and so forth. Similar problems have been extensively studied for other forms of data, such as images and videos. However, the discrete nature of natural language makes the disentangling of textual representations more challenging (e.g., the manipulation over the data space cannot be easily achieved).

SUMMARY

According to aspects of the present invention, a computer-implemented method is provided for disentangled data generation. The method includes accessing, by a bidirectional Long Short-Term Memory (LSTM) with a multi-head attention mechanism, a dataset including a plurality of pairs each formed from a given one of a plurality of input text structures and given one of a plurality of style labels for the plurality of input text structures. The method further includes training the bidirectional LSTM as an encoder to disentangle a sequential text input into disentangled representations comprising a content embedding and a style embedding based on a subset of the dataset. The method also includes training a unidirectional LSTM as a decoder to generate a next text structure prediction for the sequential text input based on previously generated text structure information and a current word, from a disentangled representation with the content embedding and the style embedding.

According to other aspects of the present invention, a computer program product is provided for disentangled data generation. The computer program product includes a non-transitory computer readable storage medium having program instructions embodied therewith. The program instructions are executable by a computer to cause the computer to perform a method. The method includes accessing, by a bidirectional Long Short-Term Memory (LSTM) with a multi-head attention mechanism, a dataset including a plurality of pairs each formed from a given one of a plurality of input text structures and given one of a plurality of style labels for the plurality of input text structures. The method further includes training the bidirectional LSTM as an encoder to disentangle a sequential text input into disentangled representations comprising a content embedding and a style embedding based on a subset of the dataset. The method also includes training a unidirectional LSTM as a decoder to generate a next text structure prediction for the sequential text input based on previously generated text structure information and a current word, from a disentangled representation with the content embedding and the style embedding.

According to further aspects of the present invention, a computer processing system is provided for disentangled data generation. The computer processing system includes a memory device for storing program code. The computer processing system further includes a processor device operatively coupled to the memory device and configured to run the program code to access, using a bidirectional Long Short-Term Memory (LSTM) with a multi-head attention mechanism, a dataset including a plurality of pairs each formed from a given one of a plurality of input text structures and given one of a plurality of style labels for the plurality of input text structures. The processor device further runs the program code to train the bidirectional LSTM as an encoder to disentangle a sequential text input into disentangled representations comprising a content embedding and a style embedding based on a subset of the dataset. The processor device also runs the program code to train a unidirectional LSTM as a decoder to generate a next text structure prediction for the sequential text input based on previously generated text structure information and a current word, from a disentangled representation with the content embedding and the style embedding.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to controlled text generation with supervised representation disentanglement and mutual information minimization.

In accordance with one or more embodiments of the present invention, a method is proposed that effectively manifests disentangled representations of text without any supervised information of the available contents. Specifically, a new mutual information upper bound is derived to measure dependence between style and content presentations. By minimizing this upper bound, the method manages to induce style embeddings and content embeddings into two independent low-dimensional spaces.

In accordance with one or more embodiments of the present invention, a novel information theoretical text DRL framework is introduced. Representative latent embeddings (i.e. style and content embeddings) are learned by maximizing mutual information between latent embeddings and original data. A model in accordance with the present invention reduces the dependency between style and content embeddings by minimizing the mutual information between the two embedding spaces.

In one or more embodiments, the present invention introduces an information-theoretical term to numerically measure the quality of disentangled representation learning.

In one or more embodiments, the present invention minimizes the upper bound of the measurement to propose a novel text representation disentangling method which explicitly reduce the correlation between embedding spaces.

In one or more embodiments, the present invention derives a new mutual information upper bound. By minimizing this upper bound, the dependency of style and content embedding spaces can effectively decrease.

Figure 1:
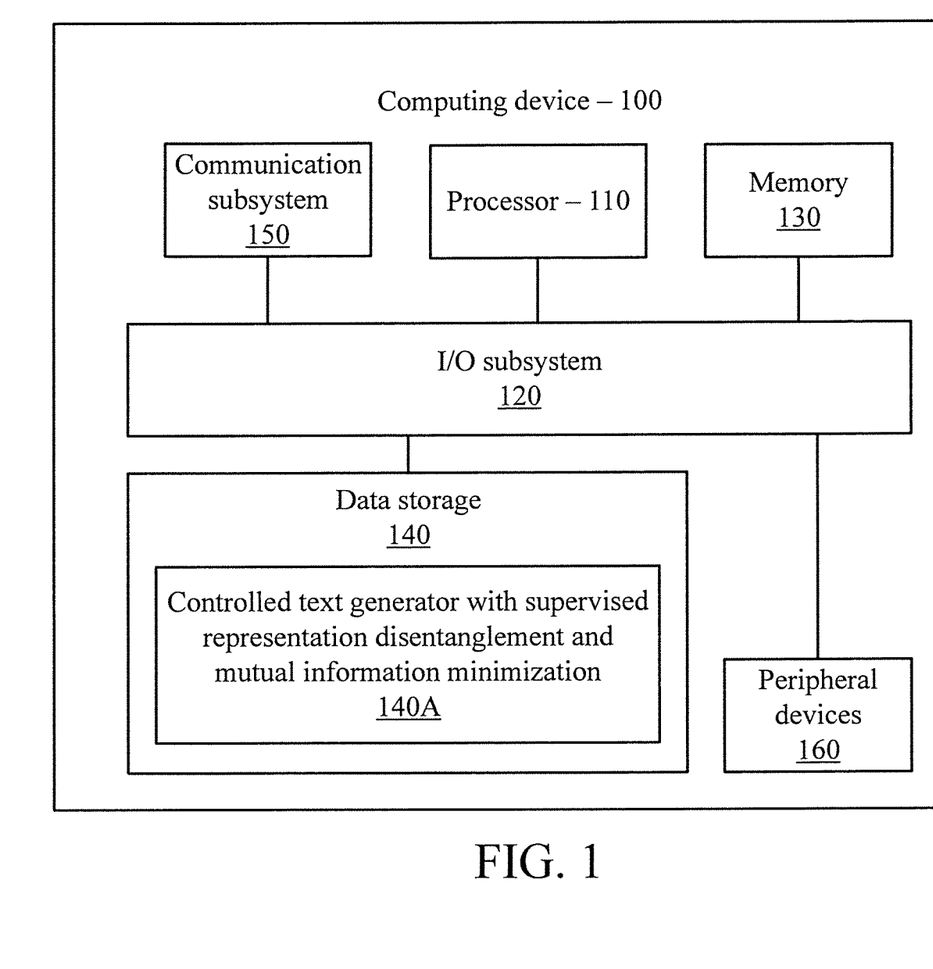
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform controlled text generation with supervised representation disentanglement and mutual information minimization.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for a controlled text generator with supervised representation disentanglement and mutual information minimization. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
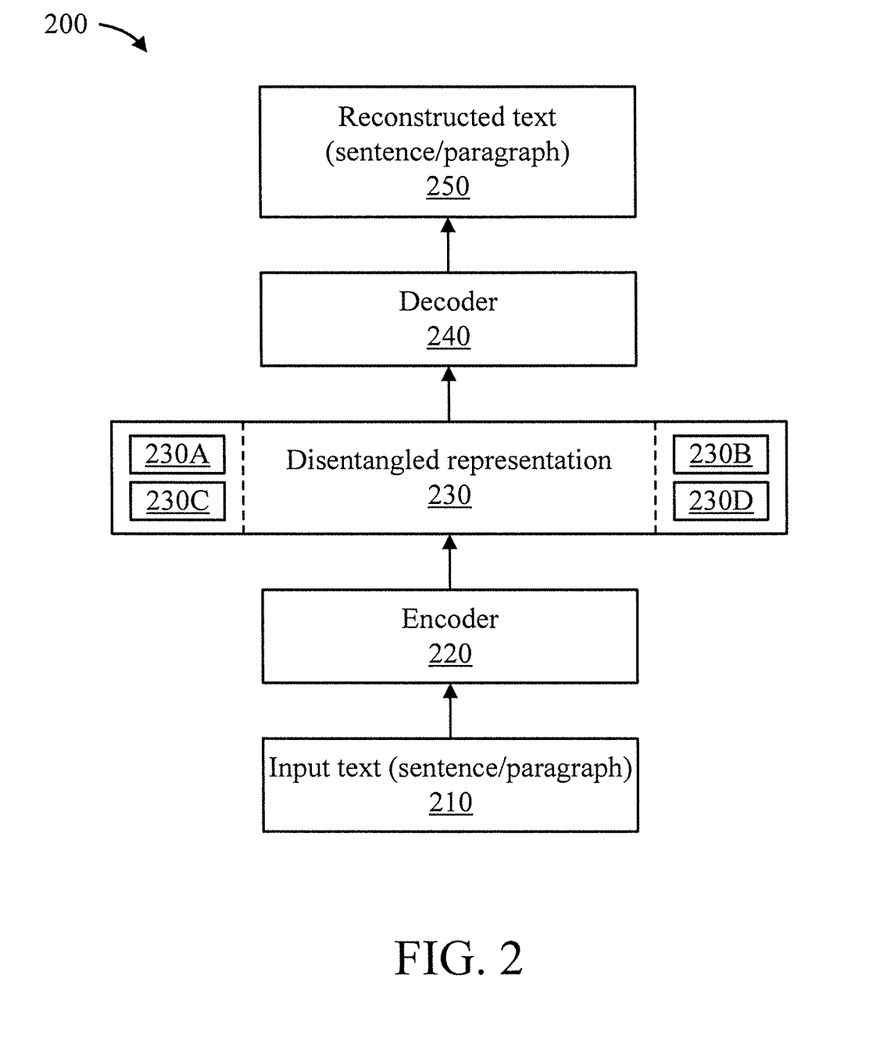
FIG. 2 is a block diagram showing an exemplary architecture, in accordance with an embodiment of the present invention.

These and other variations of a hardware processor subsystem are also contemplated in accordance with embodiments of the present invention FIG. 2 is a block diagram showing an exemplary architecture 200, in accordance with an embodiment of the present invention.

The architecture 200 includes an input sentence/paragraph 210, an encoder 220, a disentangled representation 230, a decoder 240, and reconstructed text (sentence/paragraph 250).

The disentangled representation 230 includes content with sentence reconstruction regularization 230A and style with label prediction regularization.

The input text 210 is provided to the encoder 220.

The encoder 220 encodes a disentangled representation 230 that includes sentence reconstruction regularization 230A and style with label prediction regularization 230B. The disentangled representation can further include mutual information minimization 230C and D between the content reconstruction regularization 230A and the supervised regularization 230B, respectively.

The decoder decodes the disentangled representation 230 to provide the reconstructed text 250.

Figure 3:
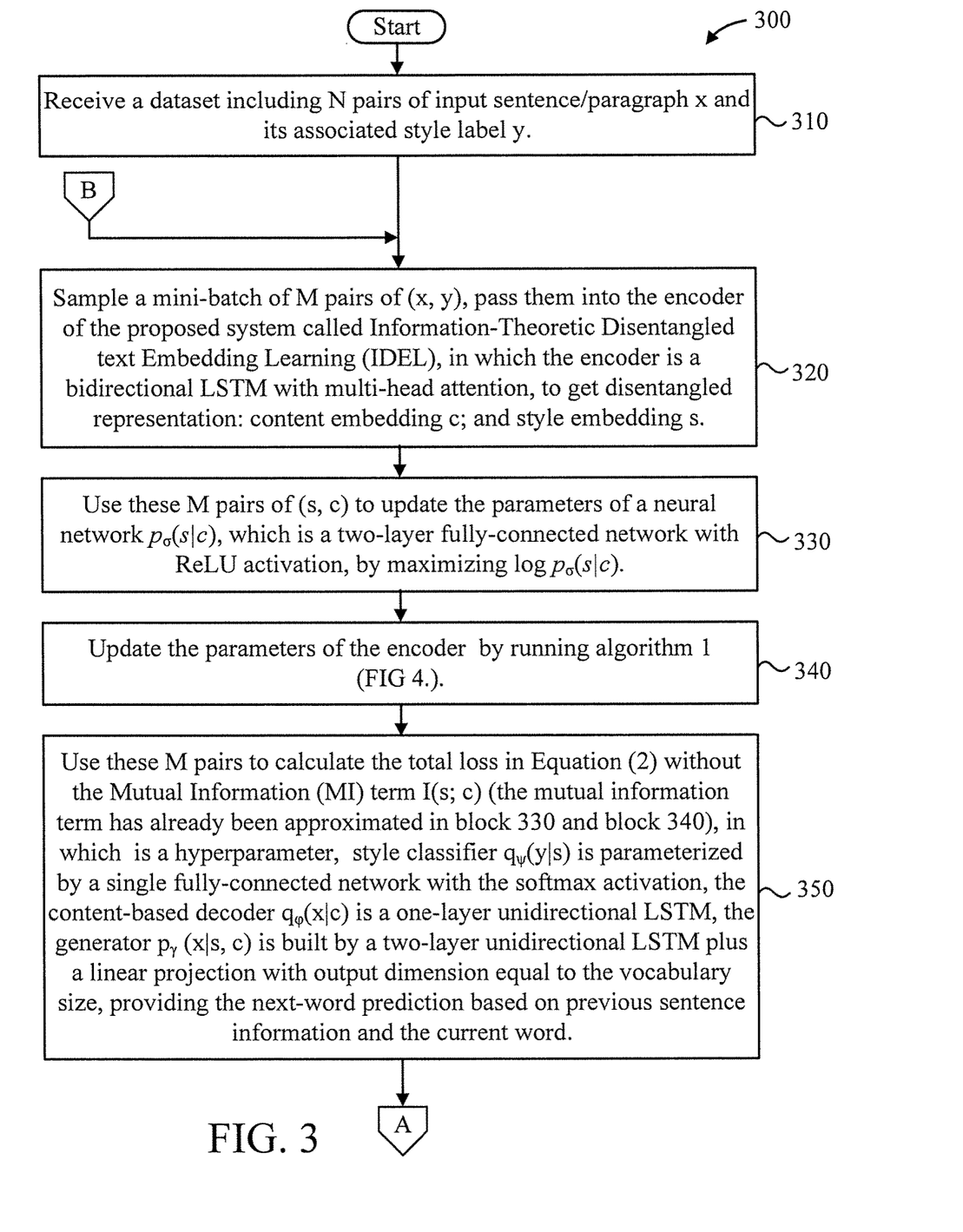
FIGS. 3-4 are flow diagrams showing an exemplary method for controlled text generation with supervised representation disentanglement and mutual information minimization, in accordance with an embodiment of the present invention.
Figure 4:
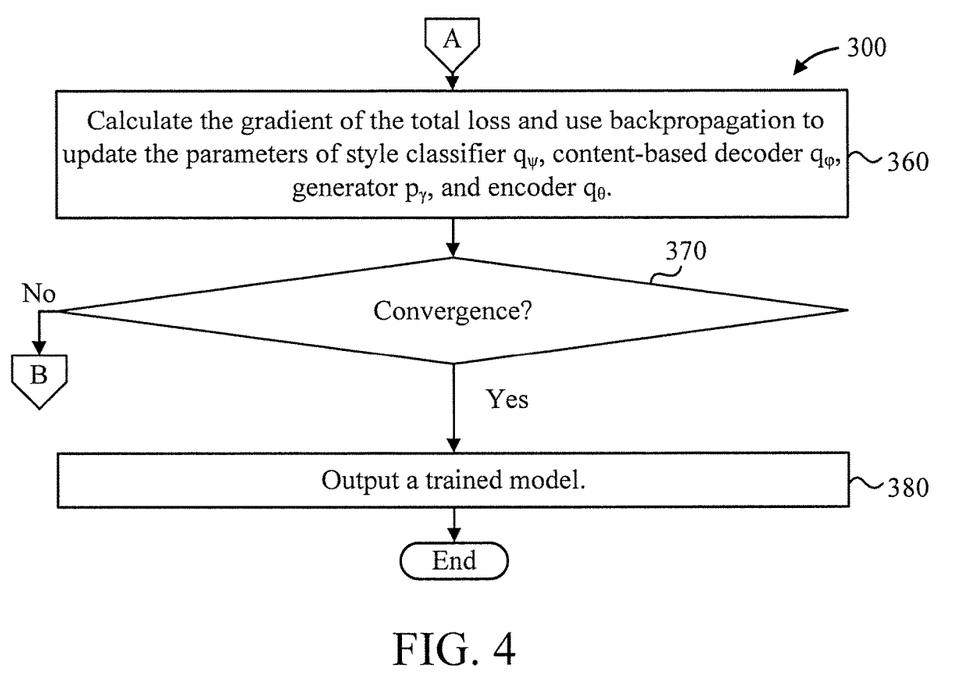

FIGS. 3-4 are flow diagrams showing an exemplary method 300 for controlled text generation with supervised representation disentanglement and mutual information minimization, in accordance with an embodiment of the present invention.

At block 310, receive a dataset including N pairs of input sentence/paragraph x and its associated style label y.

At block 320, sample a mini-batch of M pairs of (x, y), pass them into the encoder $g_\theta(s, c|x)$ of the proposed system called Information-Theoretic Disentangled text Embedding Learning (IDEL), in which the encoder is a bidirectional LSTM with multi-head attention, to get disentangled representation: content embedding c; and style embedding s.

At block 330, use these M pairs of (s, c) to update the parameters of a neural network $p_o(s|c)$, which is a two-layer fully-connected network with ReLU activation, by maximizing log $p_o(s|c)$.

At block 340, update the parameters of the encoder $q_\theta(s, c|x)$ by running algorithm 1 (see FIG. 4).

$$\mathcal{L}_{Dis}=I(s;c)-\mathbb{E}_{p(x,c)}[\log q_\phi(x|c)]-\mathbb{E}_{p(y,s)}[\log q_\psi(y|s)].$$

$$\mathcal{L}_{VAE}=KL(q_\theta(s,c|x)\|p(s,c))-\mathbb{E}_{q_\theta(s,c|x)}[\log p_\gamma(x|s,c)]. \quad (1)$$

$$\mathcal{L}_{total}=\beta \mathcal{L}_{Dis}+\mathcal{L}_{VAE} \quad (2)$$

At block 350, use these M pairs to calculate the total loss in Equation (2) without the Mutual Information (MI) term I(s; c) (the mutual information term has already been approximated in block 330 and block 340), in which $\beta>0$ is a hyperparameter, style classifier $q_\psi(y|s)$ is parameterized by a single fully-connected network with the softmax activation, the content-based decoder $q_\phi(x|c)$ is a one-layer unidirectional LSTM, the generator $p_\gamma(x|s, c)$ is built by a two-layer unidirectional LSTM plus a linear projection with output dimension equal to the vocabulary size, providing the next-word prediction based on previous sentence information and the current word.

At block 360, calculate the gradient of the total loss and use backpropagation to update the parameters of style classifier $q_\psi$, content-based decoder $q_\phi$, generator $p_\gamma$, and encoder $q_\theta$.

At block 370, determine if convergence has been reached. If so, the proceed to block 380. Otherwise, return to block 320.

At block 380, output a trained model.

Figure 5:
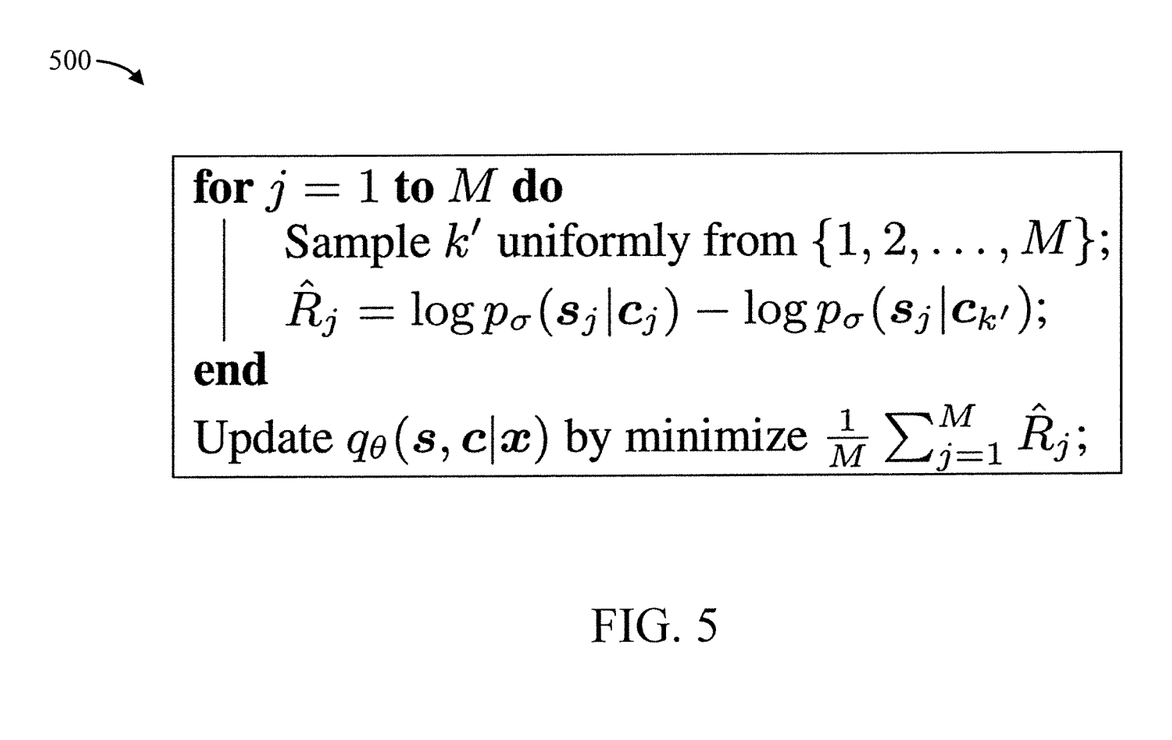
FIG. 5 is a diagram showing exemplary pseudocode for Algorithm 1, in accordance with an embodiment of the present invention.

FIG. 5 is a diagram showing exemplary pseudocode 500 for Algorithm 1, in accordance with an embodiment of the present invention.

FIG. 5 describes a step-by-step algorithm to update the parameters of the encoder of IDEL to approximately minimize the mutual information between content embedding c and style embedding s based on a new upper bound of mutual information between c and s.

Figure 6:
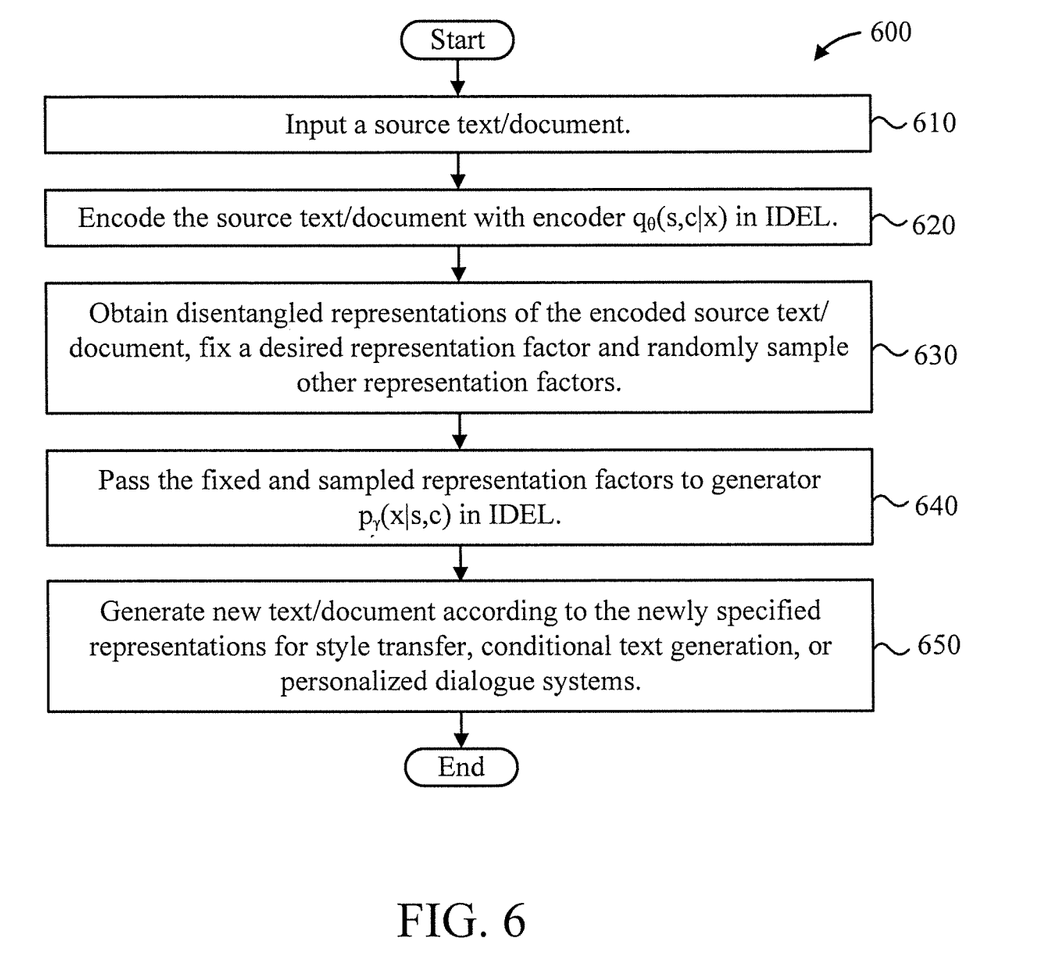
FIG. 6 is a flow diagram showing an exemplary method for new text/document generation, in accordance with an embodiment of the present invention.

FIG. 6 is a flow diagram showing an exemplary method 600 for new text/document generation, in accordance with an embodiment of the present invention.

At block 610, input a source text/document.

At block 620, encode the source text/document with encoder $g_\theta(s,c|x)$ in IDEL.

At block 630, obtain disentangled representations of the encoded source text/document, fix a desired representation factor and randomly sample other representation factors. For example, fix a content embedding vector c while randomly sampling other factors such as style embedding vector s.

At block 640, decode the fixed and sampled representation factors with generator $p_\gamma(x|s, c)$ in IDEL.

At block 650, generate new text/document according to the newly specified representations for style transfer, conditional text generation, or personalized dialogue systems.

Figure 7:
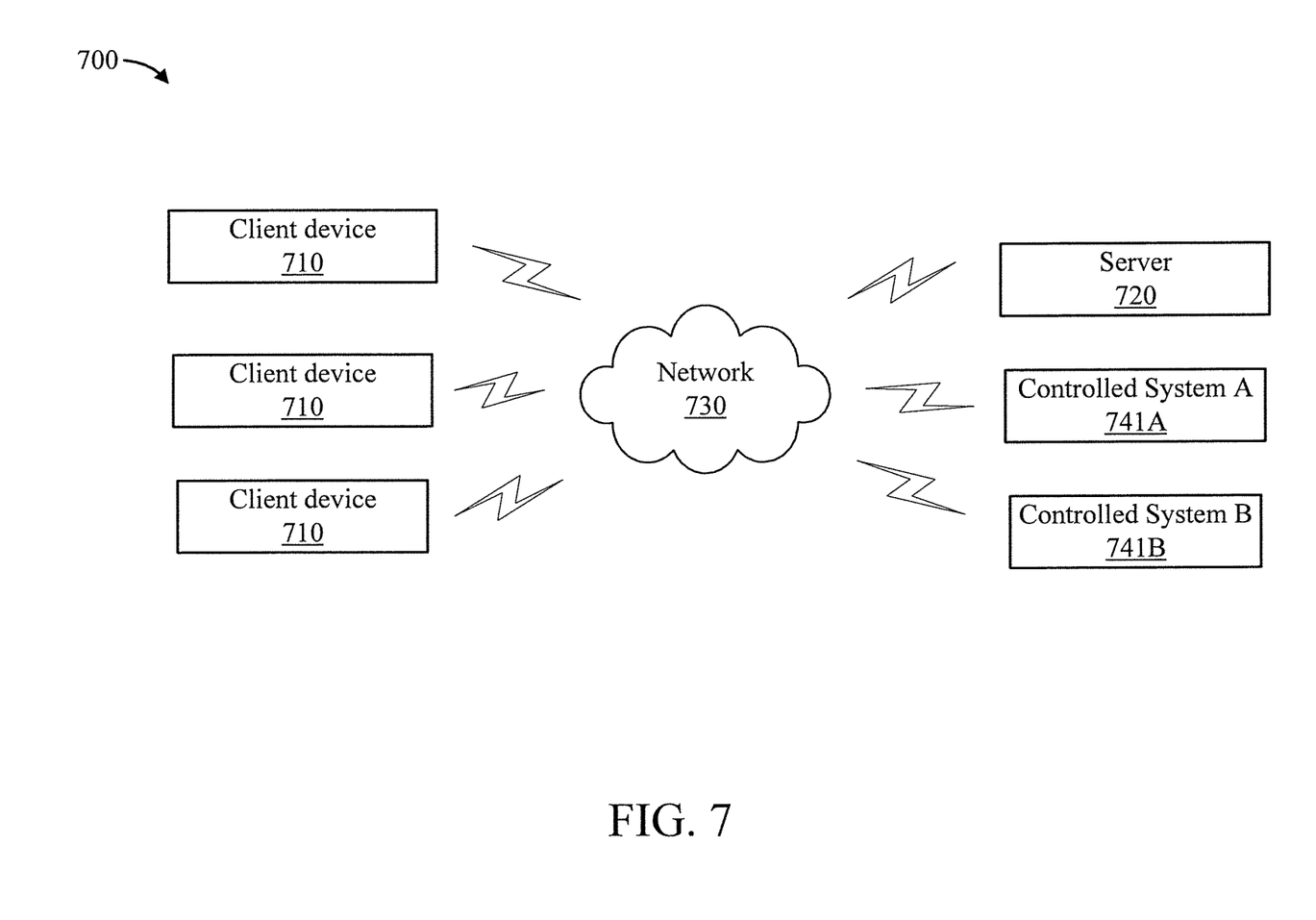
FIG. 7 is a block diagram showing an exemplary computing environment, in accordance with an embodiment of the present invention.

FIG. 7 is a block diagram showing an exemplary computing environment 700, in accordance with an embodiment of the present invention.

The environment 700 includes a server 710, multiple client devices (collectively denoted by the figure reference numeral 720), a controlled system A 741, a controlled system B 742.

Communication between the entities of environment 700 can be performed over one or more networks 730. For the sake of illustration, a wireless network 730 is shown. In other embodiments, any of wired, wireless, and/or a combination thereof can be used to facilitate communication between the entities.

The server 710 receives sequential data inputs from client devices 720. The server 710 may control one of the systems 741 and/or 742 based on a prediction generated from a disentanglement model stored on the server 710. In an embodiment, the sequential data inputs can relate to time series data that, in turn, relates to the controlled systems 741 and/or 742 such as, for example, but not limited to sensor data. Control can relate to turning an impending failing element off, swapping out a failed component for another operating component, switching to a secure network, and so forth.

A further description will be given of a method, in accordance with an embodiment of the present invention.

Suppose input data is given as $$\{(x_i, y_i)\}_{i=1}^{N}$$

where each $x_i$ is a sentence drawn from a distribution $p(x)$ and $\mathcal{Y}_i$ is the label indicating the style of $x_i$. It is desired to encode each sentence $x_i$ into style embedding $s_i$ and content embedding $c_i$ with an encoder $q_\theta(s,c|x)$, $$s_i, c_i | x_i \sim q_\theta(s,c|x). \quad (3)$$

In practice, the dimension of content embedding space is higher than the dimension of style embedding space, because the content always includes more information than the style does.

The collection of style embeddings $$\{s_i\}_{i=1}^{N}$$

be regarded as samples drawn from a variable s in the style embedding space, while the collection of content embeddings $$\{c_i\}_{i=1}^{N}$$

are samples from a variable c in the content embedding space.

To disentangle the style and content embeddings, the mutual information between s and c is minimized as I(s; c). Meanwhile, the latent embeddings s and c should sufficiently, respectively, include style information and content information from sentences x. Therefore, I(s; x) and I(c; x) are maximized at the same time. To sum up, the overall disentangled representation learning objective in accordance with an embodiment of the present invention is as follows:

$$\mathcal{L}_{Dis} = [I(s;c) - (x;c) - I(x;s)].$$

A description will now be given regarding a theoretical justification to the objective, in accordance with an embodiment of the present invention.

The objective $\mathcal{L}_{Dis}$ has a strong connection with the dependence measurement in information theory. As described above, Variation of Information (VI) is a well-defined metric of independence between variables. Applying the triangle inequality to s, c and x, the following is obtained:

$$VI(s;x) + VI(x;c) \geq VI(s;c) \quad (4)$$

The equality reaches if and only if the information from variable x is totally separated into two independent variable s and c, which is an ideal scenario for disentangling sentence x into style embedding s and content embedding c. Therefore, the difference between left-hand side and right-hand side in Equation (4) measures the degree of disentanglement as follows:

$$D(x;s,c) = VI(s;x) + VI(x;c) - VI(c;s).$$

From Equation (4), it is known that $D(x; \mathcal{Y}, z)$ is always non-negative. By the definition of VI in Equation (1), D(x; s, c) can be simplified to the following:

$$VI(c;x) + VI(x;s) - VI(s;c) = 2H(x) + 2[I(s;c) - I(x;c) - I(x;s)].$$

Since H(x) is a constant derived from data, only I(s; c)−I(x; c)−I(x; s) is minimized, which is exactly the first term in our objective $\mathcal{L}_{Dis}$.

However, minimizing the exact value of mutual information in the objective $\mathcal{L}_{Dis}$ will cause numerical instability, especially when the dimension of latent embeddings is large. Therefore, several MI estimations are introduced herein to effectively learn disentangled representations.

A description will now be given of a MI variation lower bound, in accordance with an embodiment of the present invention.

Here, the lower bound estimation of objective terms I(x;c), I(x;s), and I(s; $\mathcal{Y}$) is discussed, which need to be maximized.

For I(s; x), noting that s→x→v is a Markov Chain, by the MI data-processing inequality, we have I(s; x)≥I(s; $\mathcal{Y}$). Then, maximizing I(s; x) is converted into maximizing the lower bound I(s; $\mathcal{Y}$).

For the other two terms I(x; c) and I(s; $\mathcal{Y}$), the variational lower bound can be derived. Suppose $g_\theta(x|c)$ is a variational decoder, then the following applies:

$$\begin{aligned} I(c; x) &= H(x) - H(x \mid c) \\ &= H(x) + \mathbb{E}_{p(x,c)}[\log p(x \mid c)] \\ &= H(x) + \mathbb{E}_{p(x,c)}[\log q_\theta(x \mid c)] \\ &\quad + \mathbb{E}_{p(c)}[KL(p(x \mid c) \| q_\theta(x \mid c))] \\ &\geq H(x) + \mathbb{E}_{p(x,c)}[\log q_\theta(x \mid c)] \end{aligned}$$

Figure 8:
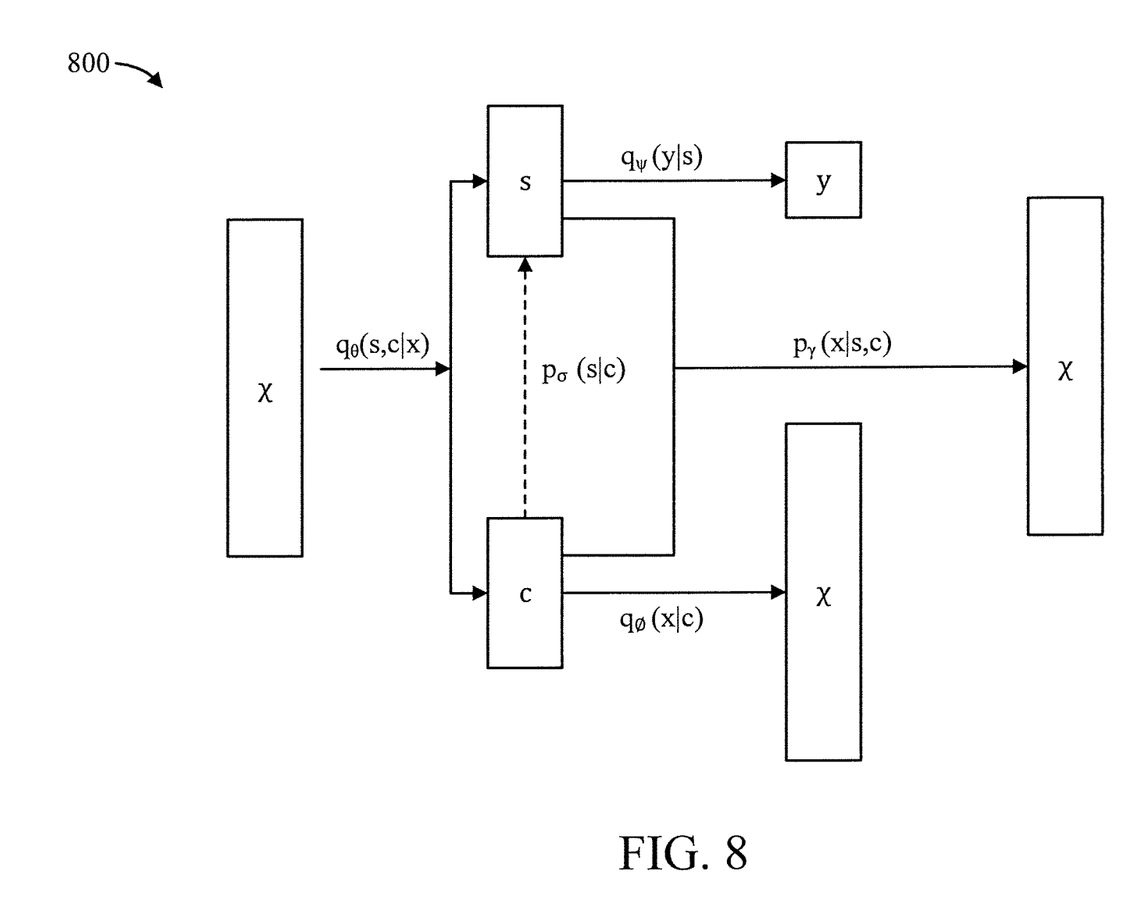
FIG. 8 is a block diagram showing an exemplary framework, in accordance with an embodiment of the present invention.

FIG. 8 is a block diagram showing an exemplary framework 800, in accordance with an embodiment of the present invention. Each sentence x is encoded into style embedding s and content embedding c. The style embedding s goes through a classifier $q_\psi(\mathcal{Y}|s)$ to predict the style label $\mathcal{Y}$; the content embedding c is used to reconstruction the information of x. A network $p_a(s|c)$ helps disentangle style and content embeddings. The generator $p_\gamma(x|s, c)$ generates sentences based on the combination of s and c.

Here the inequality is based on the fact that the KL-divergence is always non-negative. Similarly, introducing the variational distribution $q_\psi(s|\Psi)$, another variational lower bound for $I(s; \Psi)$ can be obtained as $I(s; \Psi) \geq H(\Psi) + \mathbb{E}_{p(\Psi,s)}[\log q_\psi(\Psi|s)]$. Based on three lower bounds derived herein, an upper bound for the objective is obtained as follows:

$$\mathcal{L}_{Dis} \leq I(s;c) - H(x) - \mathbb{E}_{p(x,c)}[\log q_\phi(x|c)]$$

$$-[H(\Psi) - \mathbb{E}_{p(\Psi,s)}[\log q_\psi(\Psi|s)]]$$

Noting both $H(x)$ and $H(\Psi)$ are constant numbers from the data, only the following needs to be minimized:

$$\bar{\mathcal{L}}_{Dis} = I(s;c) - \mathbb{E}_{p(x,c)} - \mathbb{E}_{p(x,c)}[\log q_\phi(x|c)] - [\log q_\psi(\Psi|s)] \quad (5)$$

An intuitive explanation is given to $\bar{\mathcal{L}}_{Dis}$. The style embedding s and content embedding c are expected to be independent by minimizing mutual information $I(s; c)$, while they also need to be representative: the style embedding s is encouraged to give better prediction of style label $\Psi$ maximizing $\mathbb{E}[\log q_\psi(\Psi|s)]$; the content embedding should maximize the log-likelihood $\mathbb{E}_{p(\Psi,s)p(x,c)}[\log q_\phi(x|c)]$ to include sufficient information from sentence x.

A description will now be given regarding a MI sample-based upper bound, in accordance with an embodiment of the present invention.

To estimate $I(s; c)$, a novel sample based upper bound is proposed. Assume there are M latent embedding pairs $$\{(s_j, c_j)\}_{j=1}^M$$

drawn from $p(s,c)$. As shown in Theorem 3.1, an upper bound of mutual information is derived based on the samples.

Theorem 3.1. if $(s_j, c_j) \sim p(s,c)$, $j=1, \ldots, M$, then $$I(s;c) \leq \mathbb{E}\left[\frac{1}{M}\sum_{j=1}^M R_j\right] = \hat{I}(s,c), \quad (6)$$

where $R_j = \log p(s_j|c_j) - \frac{1}{M}\sum_{k=1}^M \log p(s_j|c_k)$.

Based on Theorem 3.1, given embedding samples $$\{s_j, c_j\}_{j=1}^M, \frac{1}{M}\sum_{j=1}^M R_j$$

can be minimized as an unbiased upper bound of $I(s; c)$. To calculate $R_j$, the condition distribution $p(s|c)$ is required. Two solutions are proposed to obtain the conditional distribution $p(s|c)$: (1) using the Bayesian rule, derive the $p(s|c)$ from the variational encoder distribution $p(s,c|x)$ and $p(c|x)$; (2) using a neural network $p_o(s|c)$ to approximate $p(s|c)$. In practice, the first approach is not numerically stable. Here we mainly focus on the neural network approximation.

In implementation of the upper bound in Equation (6), M sentence $\{x_j\}$ is first encoded into the encoder $g_\theta(s, c|x)$ to obtain the sampled embedding pairs $\{(s_j, c_j)\}$. Then the condition distribution $p_o(c|x)$ is trained by maximizing the loglikelihood $$\frac{1}{M}\sum_{j=1}^M \log p_\sigma(s_j|c_j).$$

After the training of $p_o((s|c)$ is finished, $R_j$ is calculated for each embedding pair $(s_j, c_j)$. Finally, the gradient for $$\frac{1}{M}\sum_{j=1}^M R_j$$

is calculated and back-propagated to the encoder $q_\theta(s, c|x)$. The reparameterization trick is applied to ensure the gradient back-propagating through the sampled embeddings $(s_j, c_j)$. When the encoder weights update, the distribution $q_\theta(s, c|x)$ changes, which leads to the changing of conditional distribution $p(s/c)$. Therefore, the approximation network $p_o(s|c)$ needs to be updated again. Consequently, in the training scheme, the encoder network $q_\theta(s, c|x)$ and the approximation network $p_o(s|c)$ are alternatively updated.

Similarly, another MI upper bound can be derived based on the conditional distribution $p(c|s)$. However, the neural network approximation to $p(s/c)$ has lower performance than the approximation to $p(c|s)$. That is because the dimension of c is much higher than the dimension of s, which leads to $p(c|s)$ a high-dimensional distribution. Alternatively, the lower-dimensional distribution p $(s|c)$ is relatively easier to approximate with neural networks.

A description will now be given regarding an encoder/decoder framework, in accordance with an embodiment of the present invention.

One important downstream task for disentangled representation learning (DRL) is conditional generation. The MI-based text DRL method of the present invention can be also embedded into a Encoder-Decoder generative model and be trained in an end-to-end scheme.

Since the proposed DRL encoder $q_\theta(s,c|x)$ is a stochastic neural network, a natural extension is adding a decoder to build a variational autoencoder. Therefore, another decoder network $p_\gamma(x|s, c)$ is introduced which generates a new sentence based on given style s and content c. In the variational autoencoder (VAE), a prior distribution $p(s,c)$ is used to regularization the posterior distribution $q_\theta(s, c|x)$ by KL-divergence minimization. At the same time, the generation log-likelihood should be encouraged. In formula, the VAE objective is as follows:

$$\mathbb{E}_{V\_AE} = KL(q_\theta(s,c|x)\|p(s,c)) - \mathbb{E}_{q_\theta(s,c|x)}[\log p_\gamma(x|s,c)].$$

The VAE objective and the MI based disentanglement term are combined together to form an end-to-end learning framework (as shown in FIG. 8). The total loss function is $\mathcal{L}_{total} = \mathcal{L}^*_{Dis} + \beta \mathcal{L}_{V\_AE}$, where $\mathcal{L}^*_{Dis}$ replaces the $I(s,c)$ term in $\mathcal{L}_{Dis}$ (Equation (5)) with the upper bound $\hat{I}(s,c)$ from Equation (6), $\beta > 0$ is a hyper-parameter reweighting the DRL and VAE objectives.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for disentangled data generation, comprising:
   accessing, by a bidirectional Long Short-Term Memory (LSTM) with a multi-head attention mechanism, a dataset including a plurality of pairs each formed from a given one of a plurality of input text structures and given one of a plurality of style labels for the plurality of input text structures;
   training the bidirectional LSTM as an encoder with a multi-head attention unit for performing disentanglement to disentangle a sequential text input into disentangled representations comprising a content embedding and a style embedding based on a subset of the dataset, the training the bidirectional LSTM comprising minimizing mutual information between the content embedding and the style embedding based on a new upper bound implemented by a predictive neural network with adversarial style training; and
   training a unidirectional LSTM as a two-layer decoder, having an output dimension equal to a vocabulary size of a vocabulary from which a next word prediction generated, to generate a next text structure prediction for the sequential text input based on previously generated text structure information and a current word, from a disentangled representation with the content embedding and the style embedding, wherein model parameters are updated using the subset of the dataset as mini-batches by maximizing a log-likelihood of an input text in a variational autoencoder framework.

2. The computer-implemented method of claim 1, wherein the bidirectional LSTM forms an encoder with a multi-head attention unit for performing disentanglement.

3. The computer-implemented method of claim 1, wherein training the bidirectional LSTM comprises minimizing mutual information between the content embedding and the style embedding based on a new upper bound implemented by a predictive neural network with adversarial-style training.

4. The computer-implemented method of claim 3, wherein training the bidirectional LSTM comprises maximizing mutual information between the content embedding and input text and maximizing mutual information between the style embedding and the input text.

5. The computer-implemented method of claim 1, further comprising updating model parameters using the subset of the dataset as mini-batches by maximizing a log-likelihood of an input text in a variational autoencoder framework.

6. The computer-implemented method of claim 1, wherein the unidirectional LSTM is a two-layer unidirectional LSTM having an output dimension equal to a vocabulary size of a vocabulary from which the next word prediction is generated.

7. The computer-implemented method of claim 1, wherein in a subsequent testing sequence, the method further comprises;
   fixing one of the disentangled representations while randomly sampling another one of the disentangled representations; and
   decoding the fixed one of the disentangled representations with the randomly sampled other one of the disentangled representations.

8. The computer-implemented method of claim 7, further comprising generating, a next text prediction according to the any of the decoded disentangled representations.

9. The computer-implemented method of claim 8, wherein the method is performed by a style transfer system.

10. The computer-implemented method of claim 8, wherein the method is performed by a personalized dialogue system.

11. The computer-implemented method of claim 1, wherein the input text structures are selected from the group consisting of sentences and paragraphs.

12. A computer program product for disentangled data generation, the computer program product comprising a non-transitory computer readable storage medium having program instructions embodied therewith, the program instructions executable by a computer to cause the computer to perform a method comprising:
   accessing, by a bidirectional Long Short-Term Memory (LSTM) with a multi-head attention mechanism, a dataset including a plurality of pairs each formed from a given one of a plurality of input text structures and given one of a plurality of style labels for the plurality of input text structures;
   training the bidirectional LSTM as an encoder with a multi-head attention unit for performing disentanglement to disentangle a sequential text input into disentangled representations comprising a content embedding and a style embedding based on a subset of the dataset, the training the bidirectional LSTM comprising minimizing mutual information between the content embedding and the style embedding based on a new upper bound implemented by a predictive neural network with adversarial-style training; and
   training a unidirectional LSTM as a two-layer decoder, having an output dimension equal to a vocabulary size of a vocabulary from which a next word prediction is generated, to generate a next text structure prediction for the sequential text input based on previously generated text structure information and a current word, from a disentangled representation with the content embedding and the style embedding, wherein model parameters are updated using the subset of the dataset as mini-batches by maximizing a log-likelihood of an input text in a variational autoencoder framework.

13. The computer program product of claim 12, wherein the bidirectional LSTM forms an encoder with a multi-head attention unit for performing disentanglement.

14. The computer program product of claim 12, wherein training the bidirectional LSTM comprises minimizing mutual information between the content embedding and the style embedding based on a new upper bound implemented by a predictive neural network with adversarial-style training.

15. The computer program product of claim 14, wherein training the bidirectional LSTM comprises maximizing mutual information between the content embedding and input text and maximizing mutual information between the style embedding and the input text.

16. The computer program product of claim 12, further comprising updating model parameters using the subset of the dataset as mini-batches by maximizing a log-likelihood of an input text in a variational autoencoder framework.

17. The computer program product of claim 12, wherein the unidirectional LSTM is a two-layer unidirectional LSTM having an output dimension equal to a vocabulary size of a vocabulary from which the next word prediction is generated.

18. The computer program product of claim 12, wherein in a subsequent testing sequence, the method further comprises:
    fixing one of the disentangled representations while randomly sampling another one of the disentangled representations; and
    decoding the fixed one of the disentangled representations with the randomly sampled other one of the disentangled representations.

19. The computer program product of claim 18, further comprising generating a next text prediction according to the any of the decoded disentangled representations.

20. A computer processing system for disentangled data generation, comprising:
    a memory device for storing program code; and
    a processor device operatively coupled to the memory device and configured to run the program code to
        access, using a bidirectional Long Short-Term Memory (LSTM) with a multi-head attention mechanism, a dataset including a plurality of pairs each formed from a given one of a plurality of input text structures and given one of a plurality of style labels for the plurality of input text structures;
        train the bidirectional LSTM as an encoder to disentangle a sequential text input into disentangled representations comprising a content embedding and a style embedding based on a subset of the dataset; and
        train a unidirectional LSTM as a two-layer decoder, having an output dimension equal to a vocabulary size of a vocabulary from which a next word prediction is generated, to generate a next text structure prediction for the sequential text input based on previously generated text structure information and a current word, from a disentangled representation with the content embedding and the style embedding, wherein model parameters are updated using the subset of the dataset as mini-batches by maximizing a log-likelihood of an input text in a variational autoencoder framework.

* * * * *